UNITED STATES PATENT OFFICE.

JOHN E. SIEBEL, OF CHICAGO, ILLINOIS.

IMPROVEMENT IN PROCESSES OF PRODUCING THE MONO OR ACID PHOSPHATE OF AMMONIA.

Specification forming part of Letters Patent No. 196,771, dated November 6, 1877; application filed February 19, 1877.

*To all whom it may concern:*

Be it known that I, JOHN E. SIEBEL, of the city of Chicago, in the county of Cook and State of Illinois, have invented certain new and useful Improvements in the Manufacture of Monophosphate of Ammonia, to be used, in connection with alkaline carbonates, in the manufacture of baking-powder, in baking and cooking, and also for other purposes, as in electroplating, soldering, and dyeing, in place of cream of tartar, alum, borax, or other acid compounds; and I hereby declare the following to be a full, clear, and exact description of the same.

The novelty of my process consists in the direct conversion of basic phosphate of lime, as contained in bone, bone-ash, bone-black, or apatite, into the monophosphate or acid phosphate of ammonia in a single operation, without the intermediate production of acid phosphate or superphosphate of lime.

About equal parts (more or less, according to purity) of ground bone-ash (or similar material) and sulphate of ammonia are mixed with water to a thick liquid, and then subjected to a boiling heat in a still-like vessel made of suitable material, so that the vapors of ammonia which will escape may be collected and utilized. If the heating is continued for a sufficient length of time the sulphate of ammonia and the bone-ash are decomposed, forming sulphate of lime and monophosphate of ammonia, the latter of which may be leached out and be evaporated to dryness, or allowed to crystallize, according to the required purity. The amount of free ammonia evolved may be diminished or entirely avoided by replacing a proper amount of the sulphate of ammonia by an equivalent of sulphuric acid, in which latter case the operation may be performed in an open vessel without the still attachment.

In its use for baking-powder and similar purposes the monophosphate of ammonia has many advantages over other acid compounds heretofore used. It is permanent, absorbing no moisture from the atmosphere, as the acid phosphates of the other bases are liable to do. It is also preferable to cream of tartar in a sanitary respect, and a given quantity of it will not only generate more carbonic acid than the same weight of cream of tartar, but, in the heat of the oven, the ammonia will combine with a portion of the carbonic acid and volatilize, thereby giving additional strength to the raising properties of the compound.

What I claim as new, and desire to secure by Letters Patent, is—

1. The process herein described for producing monophosphate or acid phosphate of ammonia in a single operation, by the action of sulphate of ammonia on bone-ash or similar material, as set forth.

2. The process herein described for producing monophosphate or acid phosphate of ammonia in a single operation, by th esimultaneous action on each other of sulphate of ammonia, sulphuric acid, and bone-ash or similar material, as set forth.

JOHN E. SIEBEL.

Witnesses:
 HIRAM J. JONES,
 D. S. MEAD.